United States Patent

[11] 3,609,720

[72] Inventor Walter Strauss
East Orange, N.J.
[21] Appl. No. 882,900
[22] Filed Dec. 8, 1969
[45] Patented Sept. 28, 1971
[73] Assignee Bell Telephone Laboratories, Incorporated
Murray Hill, N.J.

[54] MAGNETIC DOMAIN DETECTOR
6 Claims, 3 Drawing Figs.

[52] U.S. Cl. 340/174 TF, 340/174 SR, 340/174 ZB, 340/174 CC, 340/174 MC
[51] Int. Cl. G11c19/00, G11c 7/00, G11c 11/14
[50] Field of Search 340/174 TF

[56] References Cited
UNITED STATES PATENTS
3,508,225 4/1970 Smith 340/174
OTHER REFERENCES
Bell Laboratories Record, " The Magnetic Bubble" by Bobeck, June/July 1970, pages 163- 169 copy in 340-174 Ortho.

*Primary Examiner*—Stanley M. Urynowicz, Jr.
*Attorneys*—R. J. Guenther and Kenneth B. Hamlin

ABSTRACT: Single wall domains are moved synchronously in a sheet of magnetic material along channels defined by magnetically soft overlays as an in-plane magnetic field reorients. A detector is described which includes as an integral part thereof a portion of the overlay defining the propagation channels.

PATENTED SEP 28 1971 3,609,720

INVENTOR
W. STRAUSS
BY Herbert M. Shapiro
ATTORNEY

MAGNETIC DOMAIN DETECTOR

FIELD OF THE INVENTION

This invention relates to data processing arrangements and, more particularly, to the detection of single wall domains in magnetic materials in which single wall domains are propagated.

BACKGROUND OF THE INVENTION

Domain propagation devices are well known in the art. In most such devices, a reverse-magnetized domain, having spaced-apart leading and trailing domain walls, is moved controllably in a channel structured to prevent lateral motion of the domain. The Bell System Technical Journal (BSTJ), Volume XLVI, No. 8, Oct. 1967, at page 1,901 et seq., on the other hand, describes a domain which is (self) bounded by a single domain wall in the plane of the sheet and is thus free to move in that plane. Movement of a domain in the latter case is in response to a magnetic field (gradient) which displaces the domain in the absence of uncontrolled expansion thereof.

A typical magnetic sheet in which single wall domains are moved comprises, for example, a rare earth orthoferrite or a strontium or barium ferrite. The domains assume the shape of circles in the plane of a sheet of these materials. The sheets are characterized by a preferred direction of magnetization normal to the sheet, the magnetization in a first direction along that normal being considered negative (−) and the magnetization in a second direction being considered positive (+) A single wall domain in such a sheet may be visualized as a circle representing the encompassing single wall of the domain.

There are a variety of techniques for moving single wall domains. One technique comprises offset conductor loops pulsed in sequence to attract domains to next consecutive positions. This technique permits the greatest degree of control over individual domains. But the current-carrying requirements of such conductors make it difficult to realize the minute dimensions required to manipulate, for example, domains of the order of microns.

Another technique for moving signal wall domains employs a structured magnetically soft overlay on the sheet in which single wall domains are moved. Such an implementation is disclosed in copending application Ser. No. 732,705 now U.S. Pat. No. 3,534,347, filed May 28, 1968 for A. H. Bobeck. Magnetic poles move in the overlay in response to reorienting in-plane fields. The poles attract domains along a predictable path determined by the overlay pattern and the consecutive orientations of the field. This technique has the virtue that the overlay has to meet no current-carrying requirements and so can be adapted for manipulating domains of minute size. The technique also permits the movement of all domains in a sheet without discrete wiring connections.

A propagation technique employing such an overlay is clearly attractive for recirculating type memories, such as disc files, where information is moved constantly and the read and write operations are carried out at a common location. This type of organization is presently realized in accordance with prior art electromechanical techniques which provide economy and reliability by reducing the number of detection and input circuits.

An object of this invention is to provide a new and novel detection arrangement for single wall domain propagation arrangements employing a magnetically soft overlay geometry.

BRIEF DESCRIPTION OF THE INVENTION

This invention is based on the discovery that a portion of a magnetically soft overlay which defines a propagation channel for single wall domains in a suitable magnetic substrate can be used as an integral element of a detector for single wall domains moved beneath that portion in the material. Accordingly, electrical conductors are attached directly to that portion of the overlay. The portion of the overlay serves the double function of moving domains in response to reorientations of the in-plane field and of responding to the passage of domains in the substrate therebeneath to deflect an electron flow in the overlay.

The utilization of a portion of the propagation implementation as part of the detection circuit in accordance with this invention is considered a departure from prior art thinking.

DETAILED DESCRIPTION

Figure 1:
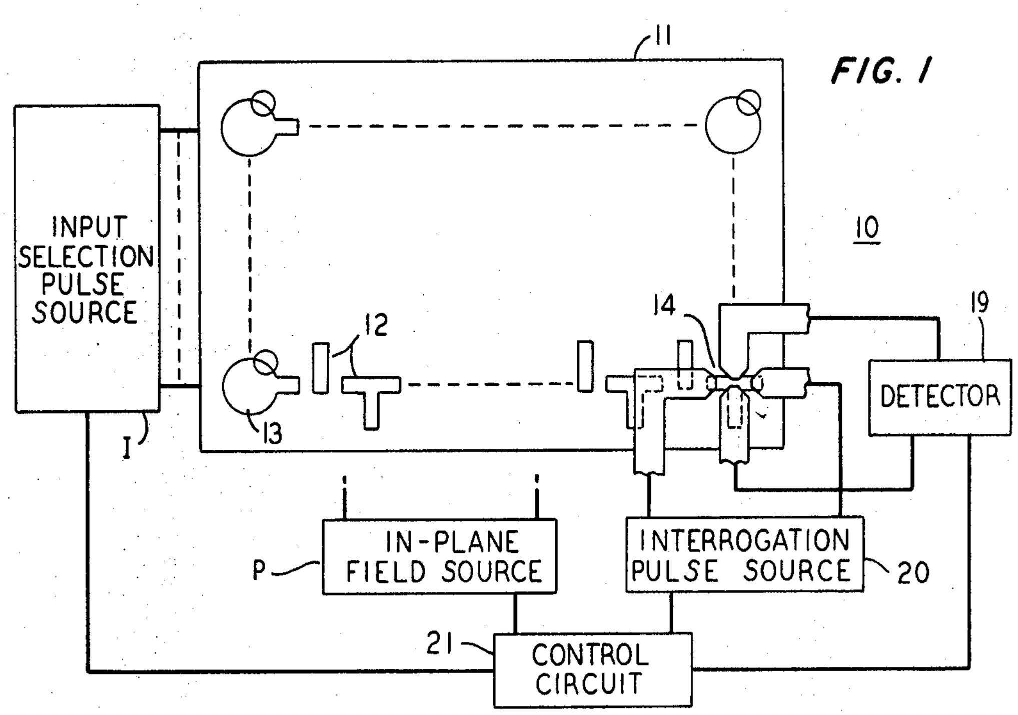
FIG. 1 is a schematic illustration of a domain propagation arrangement including a detection circuit in accordance with this invention.

FIG. 1 shows a domain propagation arrangement 10 including a sheet or slice 11 of magnetic material in which single wall domains can be moved. Illustratively, an overlay of magnetically soft bar and T-shaped elements 12 is juxtaposed with the surface of slice 11 for defining a (plurality of) propagation channel(s) between an illustrative domain source at 13 and detector at 14.

The generation of single wall domains as well as the movement of such domains along a propagation channel defined by the overlay, in response to a magnetic field reorienting in the plane of the slice of material, is well known. Our attention herein is directed at the use of a portion of that overlay as an integral part of a detection circuit. Consequently, the various circuit elements for input and propagation are represented in FIG. 1 as blocks I and P without further discussion. The detection circuit in accordance with this invention, on the other hand, is discussed in detail with reference to an enlarged view thereof in FIG. 2.

Figure 2:
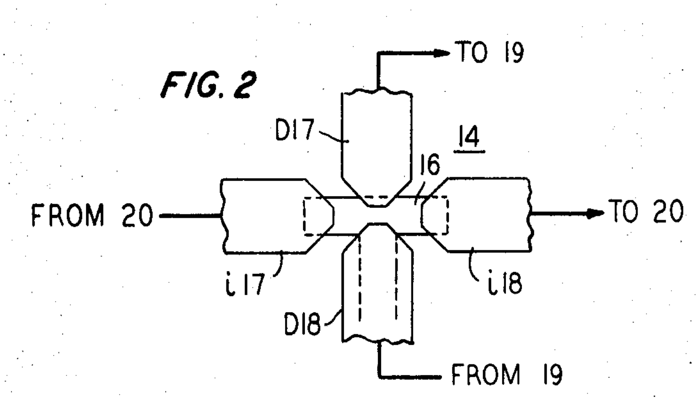
FIG. 2 is an enlarged view of a portion of the arrangement of FIG. 1.

FIG. 2 shows a representative T-shaped element 16 of the magnetically soft overlay of FIG. 1. The selected T-shaped element is at the right terminus of a propagation channel for illustrative purposes. This, of course, need not be the case. The element need not be T-shaped or at the terminus of a channel. A detector in accordance with this invention may operate in a nondestructive as well as a destructive mode. In the former mode of operation, detection may occur anywhere along a channel. In the destructive mode, of course, detection at the terminus of a channel is preferred. In this latter instance, the shape of the pertinent element of the overlay also may, for example, be round rather than T-shaped as is discussed further hereinafter.

A plurality of electrical conductors are affixed to overlay element 16. Two of these conductors, D17 and D18 (of FIG. 2), are connected to a detector represented by block 19 of FIG. 1. The remaining two conductors *i*17 and *i*18 are connected to an interrogation pulse source represented by block 20 of FIG. 1. Sources I, P, and 20, and detector 19 are connected to a control circuit 21 for activation and synchronization. The various sources, circuits and detectors may be any such elements capable of operating in accordance with this invention.

In operation, detector 14 of FIG. 2 provides a pulse in conductors D17 and D18 for detection by detector 19 when a single wall domain is moved to consecutive positions along T-shaped element 16 during normal propagation. Interrogation pulse source 20 initially establishes a flow of electrons through element 16. One explanation of the operation is that the presence of a domain in slice 11 beneath element 16 causes a deflection of the electron flow, by virtue of what is known as the planar Hall effect, into conductors D17 and D18 for detection by detector 19. Presumably this causes an induced voltage in the circuit including conductors D17 and D18. Domains so detected are moved to subsequent positions in a channel, if such positions are defined by the overlay, in response to continued rotation of the in-plane field.

Overlay element 16 is, typically, not saturated by the in-plane field; the average magnetization follows the in-plane field orientation. The output voltage observed at 19 is proportional to sin 2Φ where Φ is the angle between the direction of the current density (viz, along *i*17 and *i*18) and the average magnetization. The peak voltage is observed when the magnetization (in-plane field) is at 45° with respect to the conductors. The signal indicating the presence of a domain at 16 is due to the strong radial field, associated with a domain, which tends to realign the average magnetization.

A variety of considerations lead to optimized detection in accordance with this invention. For example, increased amplitude interrogate pulses are accompanied by increased signal outputs. But the interrogate pulses generate magnetic fields which from the geometry of FIG. 2 can be seen to be in an orientation to affect the stability of a domain. The interrogate pulse should be at a sufficiently low level to avoid unwanted instability effects. A 50-milliamperes interrogate pulse has been found suitable in samarium terbium orthoferrite slices for detecting domains having diameters of about 3 mils. Further, the lower the in-plane field level, the lower the noise level.

An overlay element of the shape shown at 16, moreover, has a shape anisotropy which alters the average magnetization from the direction of the in-plane field. A circulate geometry for that element, of course, would have no such shape anisotropy. Such a circular element would be closer to magnetic saturation for a given applied field, but a domain to be detected would have less of an effect on the magnetization and accordingly would be more difficult to detect.

A circular geometry would be quite suitable for a destructive read mode of operation where the in-plane field moves a domain continuously about the periphery of a magnetically soft overlay disc for annihilating domains which approach that disc along a propagation channel. The disc in this instance is relatively large permitting the conductors of FIG. 2 to be judiciously positioned for reducing the unwanted effects of the associated magnetic fields when (interrogate) pulses are applied thereto.

Figure 3:
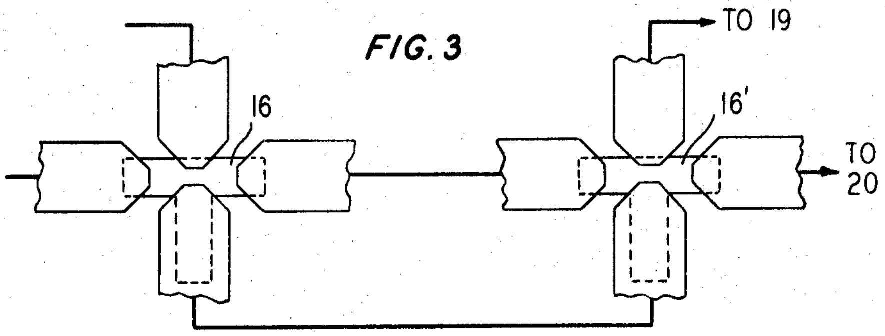
FIG. 3 is an alternative detection circuit in accordance with this invention.

Whatever the geometry of the overlay element, an interconnection electrically in series of two overlay elements in the familiar series-opposing manner of FIG. 3 reduces noise attributable to the in-plane field when a domain is moved beneath one of the overlay elements.

A bias field in a direction antiparallel to the magnetization of a single wall domain is supplied (by means not shown) normally during operation to ensure a stable domain size during operation.

What has been described is considered only illustrative of the principles of this invention. Therefore, other and varied modifications can be devised by those skilled in the art in accordance with those principles still within the spirit and scope of this invention.

What is claimed is:

1. Apparatus comprising magnetic material in a plane in which single wall domains can be moved and having a first surface, a magnetically soft overlay adjacent said first surface, said overlay comprising spaced elements having geometries to move single wall domains from input to output positions in response to a reorienting in-plane field, a plurality of electrical conductors connected to one of said elements at said output position, means for providing an electric current connected to said conductors and means for detecting the effect of a domain on said current.

2. Apparatus in accordance with claim 1 wherein said overlay comprises bar and T-shaped elements and said in-plane field reorients by rotation.

3. Apparatus in accordance with claim 2 wherein said means for providing an electric current is connected to a first pair of said plurality of electrical conductors affixed to one of said T-shaped elements, the conductors of said first pair being spaced-apart from one another along the direction of movement of a domain.

4. Apparatus in accordance with claim 3 wherein said means for detecting comprises a second pair of said plurality of electrical conductors affixed to said one of said T-shaped elements, said conductors of said second pair being spaced-apart from one another along a direction perpendicular to the direction of movement of a domain.

5. Apparatus in accordance with claim 4 including two of said T-shaped elements each having first and second pairs of electrical conductors, like designated pairs of each being connected electrically in series.

6. Apparatus in accordance with claim 4 wherein said overlay has a geometry to move single wall domains along a plurality of channels from input to associated output positions, one of each of said first and second electrical conductor pairs being affixed to an I-shaped element at each of said output positions.